United States Patent [19]
van der Heyden et al.

[11] Patent Number: 5,782,991
[45] Date of Patent: Jul. 21, 1998

[54] SURFACE TREATING PROCESS

[75] Inventors: Lambertus Geradus L. van der Heyden; Johny L. te Linde; Oscar C. Wientjes, all of Maarssen, Netherlands

[73] Assignee: Diversey Lever, Inc., Plymouth, Mich.

[21] Appl. No.: 790,879

[22] Filed: Feb. 3, 1997

[30] Foreign Application Priority Data

Feb. 13, 1996 [EP] European Pat. Off. ............ 96200333

[51] Int. Cl.$^6$ ...................................................... B08B 3/04
[52] U.S. Cl. ............................ 134/37; 134/4; 134/26; 134/28; 134/29; 510/214; 510/215; 510/405; 510/4.7; 510/433; 510/434; 510/505
[58] Field of Search .............................. 510/214, 215, 510/405, 407, 433, 434, 505; 134/4, 26, 28, 29, 37

[56] References Cited

U.S. PATENT DOCUMENTS

| | | | |
|---|---|---|---|
| 3,028,615 | 4/1962 | Helm | 15/50 |
| 3,808,036 | 4/1974 | Zdanowski | 117/138.8 |
| 3,900,438 | 8/1975 | Zdanowski et al. | 260/28.5 R |
| 3,926,893 | 12/1975 | Woodward | 260/29.6 R |
| 4,013,607 | 3/1977 | Dwyer et al. | 260/26.6 H |
| 4,017,662 | 4/1977 | Gehman et al. | 428/443 |
| 4,046,726 | 9/1977 | Meiner et al. | 260/27 |
| 4,376,175 | 3/1983 | Posten | 523/501 |
| 4,537,802 | 8/1985 | Flanagan | 427/368 |
| 4,690,779 | 9/1987 | Baker et al. | 252/546 |
| 4,778,524 | 10/1988 | Chapin | 106/10 |
| 5,191,002 | 3/1993 | Davis | 524/157 |
| 5,385,064 | 1/1995 | Ainslie | 106/15.05 |

FOREIGN PATENT DOCUMENTS

| | | |
|---|---|---|
| 215 451 | 9/1986 | European Pat. Off. . |
| 1 063 758 | 3/1967 | United Kingdom . |
| 94/22996 | 10/1994 | WIPO . |

OTHER PUBLICATIONS

European Search Report for PCT/US94/00907.

*Primary Examiner*—Jill Warden
*Assistant Examiner*—Sharidan Carrillo
*Attorney, Agent, or Firm*—A. Kate Huffman

[57] ABSTRACT

A process and device for treating and repairing a hard surface consisting of a polymer film, such as a floor surface, are provided. The process comprises the steps of:

(i) cleaning said surface with an aqueous cleaning product comprising 0.1–20% by weight of a surfactant and 0.1–80% by weight of a solvent;

(ii) applying to the cleaned floor surface a liquid repair product, the properties of which, after drying thereof, being similar to those of the polymer film; and (iii) allowing the thus-treated floor to dry for at least 5 minutes. The device is a manually operated floor treating device specially adapted for use in said process.

4 Claims, 1 Drawing Sheet

SURFACE TREATING PROCESS

FIELD OF THE INVENTION

The present invention relates to a process for treating and repairing hard surfaces, preferably floor surfaces, particularly floor surfaces consisting of a polymer film. The invention also relates to a device specially adapted for use in the process of the invention.

BACKGROUND OF THE INVENTION

Floor cleaning processes are well-known in the art. Some floor surfaces additionally need protection in order to facilitate the cleaning thereof, to avoid or diminish wear, and for aesthetical reasons. Such protection can be obtained by applying to said floor surfaces soap-based products, wax-based products or polymer-based products. Polymer-based products which generally offer the best protection, are usually polymer dispersions comprising polymer, wax, alkaline soluble resin, plasticizer and water.

Polymer dispersions are applied onto a floor surface in the form of a thin polymer film, for instance a thin acrylate polymer film. This type of film is usually hard, transparent, and resistant to wear. However, even durable polymer films are susceptable to attrition. Therefore, several products are commercially available for the maintenance of polymer films. Since the main constituent of these maintenance products is wax, the floor surface obtains the properties of the wax after treatment with such a maintenance product. In other words, the floor surface becomes less hard, less transparent and more resistant to wear, after this type of maintenance.

For the treatment of a floor surface with a waxy maintenance product of the prior art, a floor polishing machine is usually applied containing one round pad or brush and a spray-bottle. Using this machine, wax is sprayed onto the floor surface and, subsequently, said wax is polished with the brush or pad. This process is rather inefficient since a considerable amount of maintenance product disappears into the polishing brush or pad. Furthermore, wear of the polymer film is not significantly reduced by applying this method, and replacement of the polymer film will be needed after a certain period of use.

It is an object of the present invention to provide a process for treating floor surfaces consisting of a polymer film, which process does not suffer from the above-discussed problems.

At present, replacement of polymer films on floor surfaces is considered to be more and more problematic for environmental and safety reasons. Reason is that highly alkaline products and/or environmentally less desirable solvents, such as glycol ethers, are needed for said replacement.

It is, therefore, another object of the invention to find a method by which, preferably in a simple way, the quality of the polymer film can be improved so as to avoid replacement thereof.

It was surprisingly found that these and other objects can be achieved when applying the process according to the present invention. It was also found that said process can be effectively carried out using the device according to the present invention.

SUMMARY OF THE INVENTION

Accordingly, in one aspect the invention provides a process for treating and repairing a hard surface consisting of a polymer film, such as a floor surface, said process comprising the steps of:

(i) cleaning said surface with an aqueous cleaning product comprising 0.1–20% by weight of a surfactant and 0.1–80% by weight of a solvent;

(ii) applying to the cleaned floor surface a liquid repair product, the properties of which (as defined herein), after drying thereof, being similar to those of the polymer film; and (iii) allowing the thus-treated floor to dry for at least 5 minutes.

The properties of the repair product- after drying thereof- which are similar to those of the polymer film are wear resistance, gloss, transparency, hardness, removability, water-resistance, slip-resistance.

In a second aspect, the invention provides a manually operated floor treating device specially adapted for use in the process of the invention, said device comprising a grip (1), a shaft (2), two start/stop buttons (3,4), two tanks (5,6) filled with cleaning product respectively liquid repair product and situated on opposite sides of the shaft, both of which tanks being connected to a spraying nozzle (7,8) operable by way of an electric pump, and a turnable member (9) connected to the bottom side of the shaft by way of a hinge (10).

DETAILED DESCRIPTION OF PREFERRED EMBODIMENTS

Figure 1:
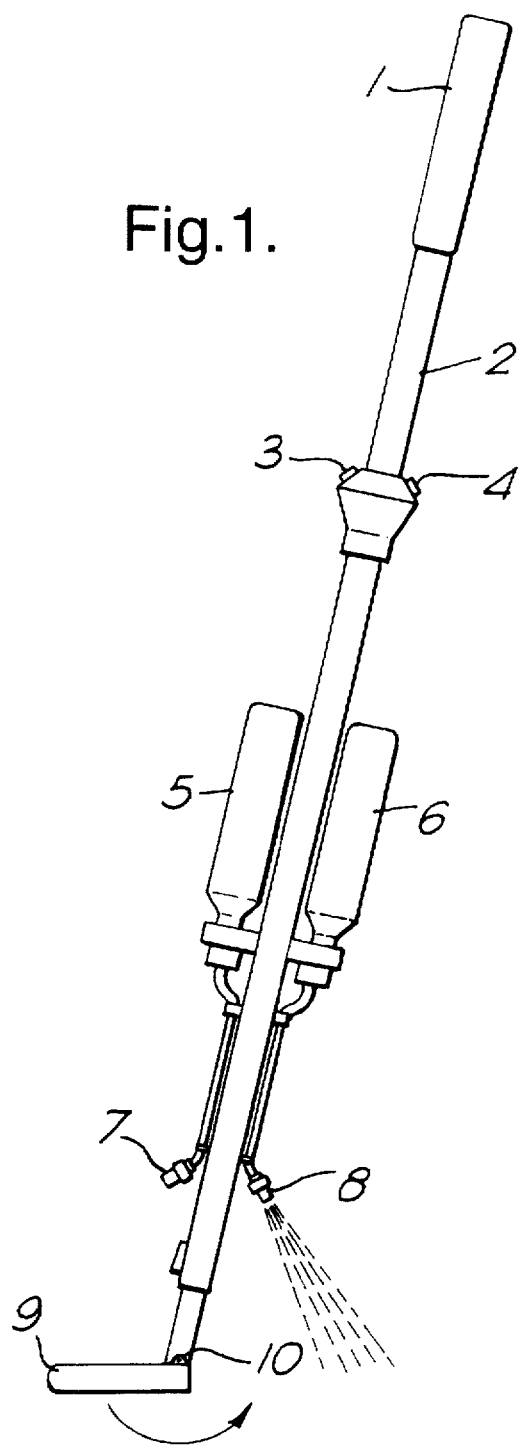
FIG. 1 is a side elevational view of the floor treating device of the invention.

The process of the invention is very suitable for repairing, in a simple way, local wear of a floor surface consisting of a polymer film while maintaining the excellent properties of the film.

The process of the invention includes a cleaning step, a repair step and a drying step. The properties of the repair product applied during the repair step, are similar to those of the polymer film to be treated and repaired: after application onto said film, the repair product exhibits similar hardness, wear resistance, slip-resistance, water resistance, gloss, removability and transparency as the original polymer film. However, for these properties to be obtainable, a good attachment of the repair product to the original polymer film is essential. Therefore, a cleaning step is required.

Suitable aqueous cleaning products according to the present invention, are those containing nonionic surfactant, preferably in an amount of 0.1–10%; by weight, and an ester as a solvent, preferably at a level of 0.1–20% by weight. The cleaning product of the invention desirably also contains up to 10% by weight of a builder material, which is preferably selected from citrates, phosphates and mixtures thereof.

It is known that various of these floor cleaning products interfere with the floor repair products according to the invention, resulting in less than optimal adhesion, gloss and transparency of the repair product. In those cases, flushing of the floor surface with clean water before treatment with the repair product is desirable for obtaining favourable results.

It has now been found that an aqueous cleaning product comprising 1–5% by weight of an aminoxide, as a surfactant, a solvent mixture including 1–20% by weight of gamma butyrolactone and 1–20% by weight of a methylic diester of glutaric, succinic and adipic acids, and 1–10% by weight of a builder selected from citrates, phosphates and mixtures thereof, all percentages being based on the cleaning product, is fully compatible with the repair product. Such cleaning products are highly desirable, since the mentioned flushing step is not needed when applying these products which simplifies the floor treatment process significantly.

The most suitable type of aminoxide for use in this type of cleaning product is cocodimethylaminoxide.

Suitable liquid repair product used in the process of the invention are those comprising 1–40% by weight of a polymer dispersion, 0.5–40% by weight of a wax dispersion, 0.5–30% by weight of a solvent and up to 100% by weight of water.

More preferably, said liquid repair product comprises additionally 0.1–10% by weight of a plasticizer, up to 20% by weight of an alkaline soluble resin, such as rosin-based resin, and up to 5% by weight of an anionic surfactant.

The wax dispersion is effectively a polyethylenewax dispersion, and the polymer dispersion is desirably a mixture of an acrylic dispersion and a polyurethane dispersion.

For improving the adhesion, cleaning and (fast-)drying properties of the liquid repair product, said product contains preferably also up to 30% by weight of an alcohol, particularly isopropanol.

It is desirable that the process of the invention is carried out in a simple way so as to enable quick treatment of the floor surface to be repaired. In order to enable such quick and simple treatment of floor surfaces, the manually operated floor treating device of the invention has been developed.

When applying this device in the process of the invention, it only needs to be lifted and turned over an angle of 180° for treatment with liquid repair product of the cleaned floor surface. Furthermore, the floor treating device of the invention contains everything needed for quick and effective repair of the floor surface. No additional materials are needed.

These characteristics allow quick and simple treatment of the floor surface.

The invention is further illustrated by FIG. 1 which shows a schematic cross-sectional view of the floor treating device according to the invention.

The floor treating device shown in FIG. 1, is manually operable by way of grip (1) which is situated at the top side of shaft (2). The two start/stop buttons (3,4) are present at the shaft not far from the grip. When button (3) is activated, liquid cleaning product is pumped out of tank (5) and sprayed by way of nozzle (7) onto the floor surface to be treated. On the other hand, when button (4) is activated, liquid repair product present in tank (6) is pumped out of said tank to spray nozzle (8) and sprayed by said spray nozzle onto the floor surface. The pumping action is achieved using electric pumps (not shown).

When using the device shown in FIG. 1, the liquid cleaning product is first sprayed on to the floor surface by way of nozzle (8). The cleaning product is subsequently distributed with a turnable member (9) which is connected to the bottom side of the shaft (2) by way of a hinge (10). In the next step, the floor cleaning machine is lifted and turned over an angle of about 180° such that the two tanks (5,6) change position. Thereafter, the liquid repair product is sprayed onto the floor surface by way of spray nozzle (7), and distributed using turnable member (9). As a last step of this treating process, the treated and repaired floor surface is allowed to dry for at least 10 minutes.

We claim:

1. A process for treating and preparing a hard surface having a polymer film, said process comprising the steps of:

i) cleaning a hard surface having a polymer film with an aqueous cleaning product comprising:
      a) 1–5% by weight of an aminoxide,
      b) a solvent mixture including 1–20% by weight of gamma
         butyrolactone and 1–20% by weight of methylic diester of glutaric, succinic and adipic acids, and
      c) 1–10% by weight of a builder selected from the group consisting of citrates, phosphates and mixtures thereof, percentages based on the total composition of said aqueous cleaning product, to obtain a cleaned floor surface having said polymer film thereon;

ii) applying to the polymer film of the cleaned floor surface a liquid repair product which dries to provide a repaired surface exhibiting properties as those exhibited by the polymer film including hardness, wear resistance, stick resistance, water resistance, gloss, removability and transparency; and iii) allowing the repaired surface to dry for at least five minutes.

2. The process according to claim 1, wherein the aminoxide is cocodimethylaminoxide.

3. The process according to claim 1, wherein the liquid repair product comprises 1–40% by weight of a polymer dispersion, 0.5–40% by weight of a wax dispersion, 0.5–30% by weight of a solvent and up to 100% by weight of water.

4. The process according to claim 3, wherein the liquid repair product additionally comprises 0.1–10% by weight of a plasticizer, up to 20% by weight of an alkaline soluble resin, and up to 5% by weight of an anionic surfactant.

* * * * *